No. 842,551. PATENTED JAN. 29, 1907.
R. L. HUNTER.
FISHING REEL.
APPLICATION FILED SEPT. 24, 1904.
2 SHEETS—SHEET 1.
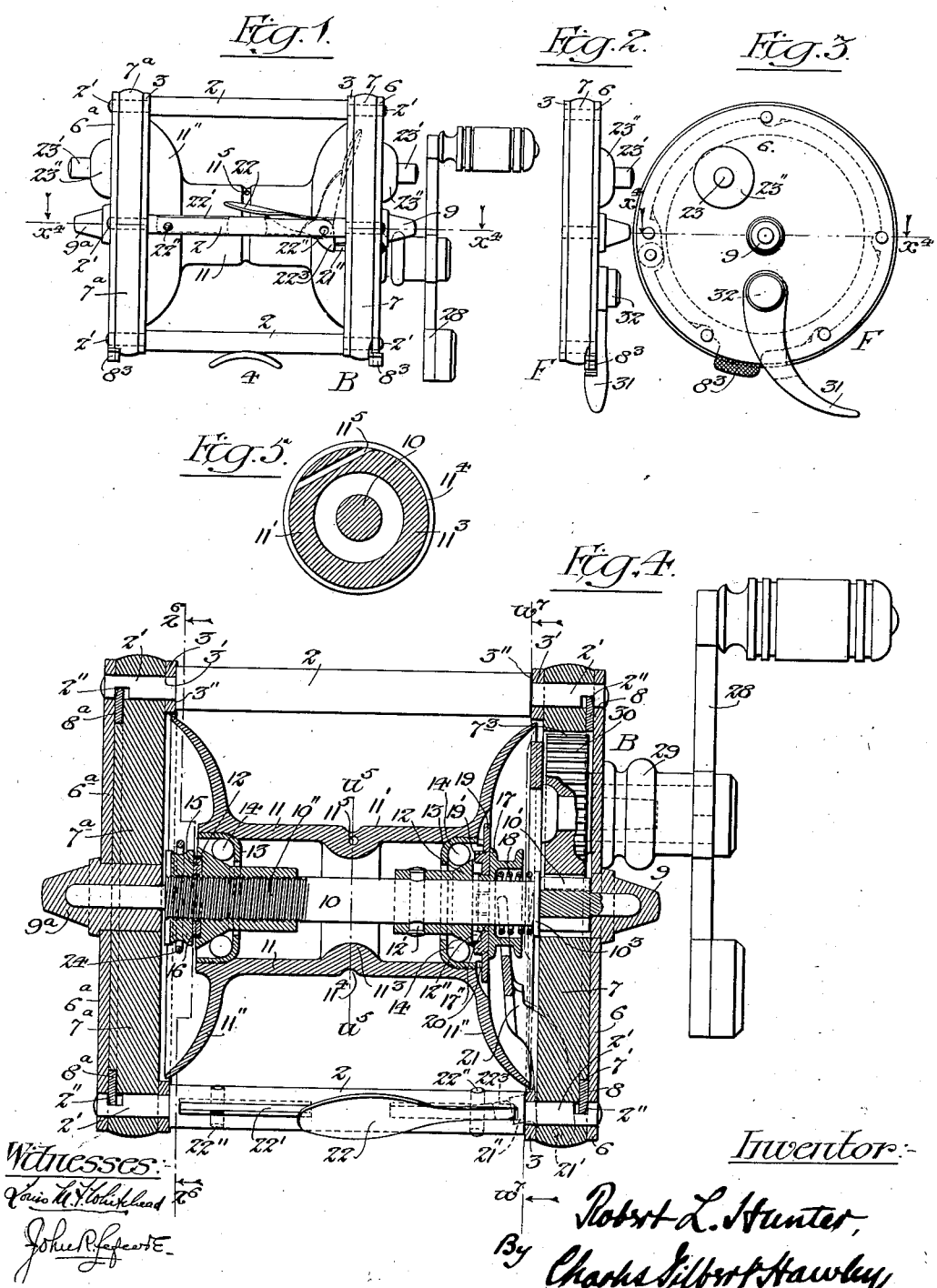

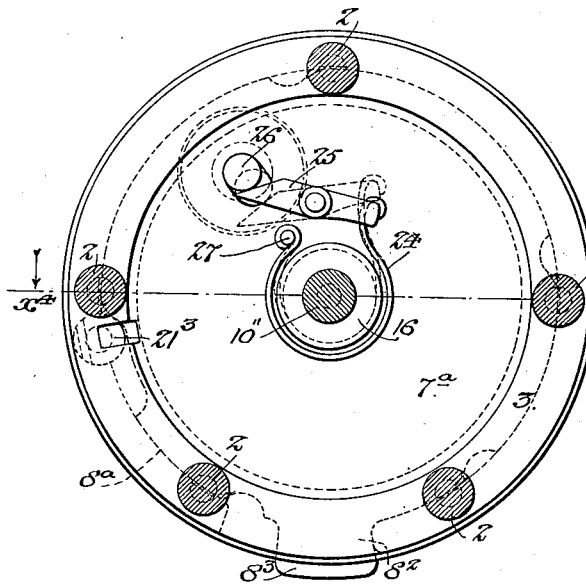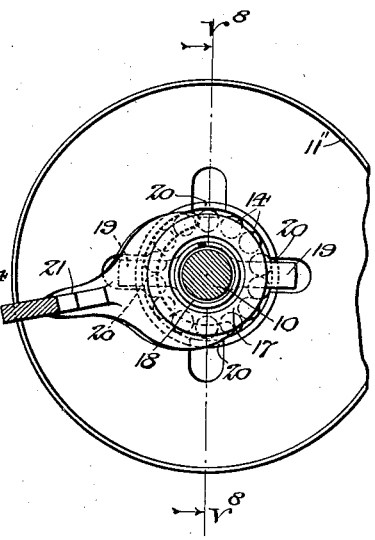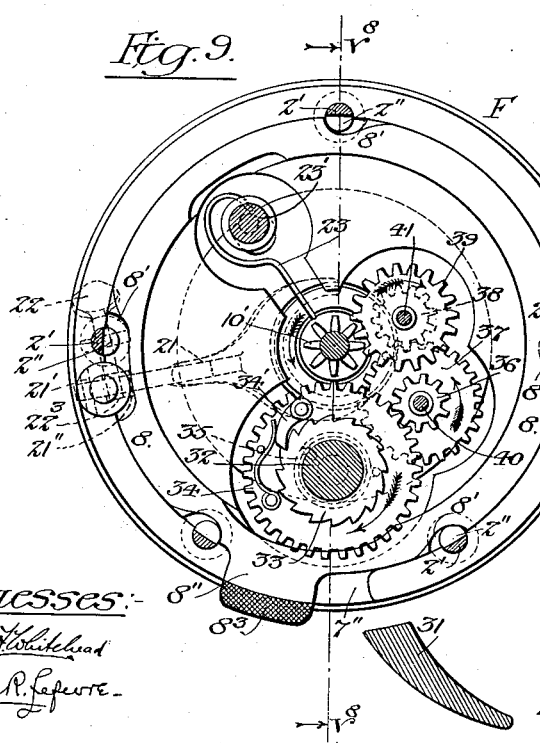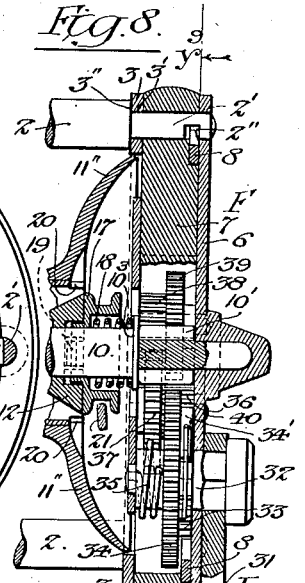

UNITED STATES PATENT OFFICE.

ROBERT L. HUNTER, OF CLEVELAND, OHIO.

FISHING-REEL.

No. 842,551.      Specification of Letters Patent.      Patented Jan. 29, 1907.

Application filed September 24, 1904. Serial No. 225,804.

*To all whom it may concern:*

Be it known that I, ROBERT L. HUNTER, a citizen of the United States, and residing at Cleveland, in the county of Cuyahoga, in the State of Ohio, have invented certain new and useful Improvements in Fishing-Reels, of which the following is a specification.

My invention relates to fishing-reels, and has special reference to improvements upon reels of that class wherein the spool is readily removable from the reel case or frame to facilitate substitution or a change of line; and the invention further and particularly relates to improvements upon the fishing-reels shown and described in Letters Patents No. 728,717, granted to me May 14, 1903, and No. 750,054, granted to me January 19, 1904, the reels therein shown being of the above class and being distinguished by a mechanism adapted to disconnect the spool from the winding mechanism, and thus permit the spool to run free to relieve the outgoing line from the retarding influence of the winding mechanism.

The object of this invention is to provide a fishing-reel that shall be composed of few readily-separable parts or sections free from screws and yet capable of being easily taken apart and as easily put together when there is need to interchange or substitute parts or to clean the reel.

Another object of the invention is to provide a free-running spool-reel, which shall be characterized by a spool-clutch-operating device adapted for actuation by the angler's thumb while the thumb is in proper position opposite the spool, as during the making of a cast.

Another object of the invention is to provide a reel of the kind here projected and in which the click and drag devices may be permanently set, if desired, and yet operate only when the winding mechanism is positively connected with the reel-spool, whereby said click and drag mechanisms or either of them shall be adapted to automatically retard the rotation of the spool from the moment that the thumb is removed from the described spool-freeing device.

A further and particular object of my invention is to provide a fishing-reel that shall be adapted for either bait-casting or fly-casting—that is, one which shall be completed by either of two interchangeable heads containing winding mechanisms.

Still another object of the invention is to provide a reel which may be easily and quickly altered from a right-hand to a left-hand reel, and, further, a reel which shall be sectional—that is, composed of unitary parts which may be interchanged as desired.

A further object of the invention is to provide a non-metallic resilient spool for fishing-reels which shall be capable of withstanding rough usage without becoming distorted or being rendered unfit for use.

A further and general object of the invention is to simplify and lessen the cost of fishing-reels, particularly those of the higher class or type.

Other objects of the invention will appear from the following detailed description.

My invention consists in a fishing-reel comprising readily-separable parts constructed and combined substantially as hereinafter specified, and my invention will be more readily understood by reference to the accompanying drawings, forming a part of this specification, and in which—

Figure 1 is an elevation of the rear side of a fishing-reel embodying my invention. Fig. 2 is an edge view of the fly-casting head, which is interchangeable with the bait-casting head shown in Fig. 1. Fig. 3 is an end view of the fly-casting head. Fig. 4 is an enlarged horizontal section of the reel on the line $x^4$ $x^4$ of Figs. 1 and 6. Fig. 5 is a detailed section of the spool on the line $u^5$ $u^5$ of Fig. 4. Fig. 6 is a vertical section on the line $z^6$ $z^6$ of Fig. 4. Fig. 7 is a sectional detail on the line $w^7$ $w^7$ of Fig. 4. Fig. 8 is an enlarged vertical section of the fly-casting head on the line $v^8$ $v^8$ of Figs. 7 and 9, and Fig. 9 is a vertical transverse section on the line $y^9$ $y^9$ of Fig. 8.

My fishing-reel is preferably composed of a plurality of parts, sections, or mechanisms which may be designated or grouped as follows: The frame, which is provided with means for engagement with the heads of the reel; the front winding-heads, containing winding mechanism and whereof there are two, one adapted for bait-casting and the other for fly-casting purposes; the rear head, which is interchangeable with either of the winding-heads; the spool-shaft, having bearings in said front and rear heads; the spool, mounted on said shaft; a clutch mechanism for connecting the said winding mechanism with said spool, and suitable click and drag mechanisms.

A particular object of my invention is to simplify and lessen the cost of reel cases or frames and at the same time provide a frame which shall be lighter and much stronger than those now in use. Another and special object is to provide a frame that will admit of the employment of head-locking devices that are arranged within the heads, whereby the use of the usual screws is avoided. With these objects in view I provide a frame that is composed of a plurality of cross members or spindles 2, usually five in number, together with the end rings 3 3 and a rod-plate 4. The plate 4 is riveted or brazed to the lower spindles 2 2 and is of the usual form. The ends 2' of the spindles 2 are of reduced diameter and fit holes 3' in the rings 3. The rings are fitted snugly against the shoulders 3'' thus afforded and are solidly brazed to the spindles 2. In this manner I construct a perfectly rigid and yet very light frame. It will be noted that the spindle ends 2' form studs, which, projecting from the frame-rings 3, are perfectly adapted to the holding of the reel-heads.

2'' 2'' are notches provided in the ends of studs 2' to receive the head-locking device before alluded to and detailed hereinafter.

I provide my reel with two interchangeable winding-heads B and F. (See Figs. 1 and 2 and Figs. 4 and 8.) They are identical in construction, except as to the winding or spool-driving mechanisms which they contain. The head proper preferably comprises a metallic disk 6 and a non-metallic disk 7, suitably secured together. The disks are provided with holes properly positioned to receive the studs 2' of the reel-frame. The non-metallic, preferably hard-rubber, portion 7 preferably appears between the metallic parts 3 and 6 when the head is placed on the frame, thus giving the reel a fine appearance. The part 7 contains a shallow annular groove 7' to receive the head-locking device or ring 8, which is held between the parts 6 and 7. This ring 8 is of sufficient diameter to enter the notches 2'' in the studs 2' and when so engaged serves to securely fasten or lock the head to the frame. The ring 8 is provided with notches 8' corresponding to the positions of the studs 2', and when the ring is turned to position the notches 8' before respective studs 2' the ring will be disengaged from the latter and the reel-head may be pulled off the studs, and thus separated from the frame. The ring may be operated in any desired manner; but I prefer to provide it with a thumb-piece or lug 8'', extending through a throw-limiting notch 7'' in the part 7. It has a milled end $8^3$ exposed beneath the head, as shown in Fig. 3, and by means of this the ring may be easily turned to lock or unlock the head. Such a locking device is extremely simple, is well protected, and is not liable to disorder, and I regard the same as a very important feature of my invention.

I do not confine the invention to the specific ring-like device here illustrated, as substitutes therefor may be readily devised. The head contains a central bearing or journal 9 for the spool-shaft 10. The portion 7 is provided with a recess $7^3$ to contain the drive-gears. The shape of the recess differs in the heads B and F, the same being made to accommodate the mechanisms pertaining thereto. The driving mechanisms will be best understood if described in connection with the spool and spool-shaft, and I defer description thereof until the said spool and spool-shaft are understood.

The rear head of the reel is identical with the front head, as above described, except that it lacks the large recess for gearing.

$6^a$ represents the metallic disk of the rear head; $7^a$, the non-metallic disk thereof, and $8^a$ the locking-ring to engage in the stud-notches 2'' and secure the rear head to the frame.

The front and rear heads are preferably of the same thickness and may be interchanged. In this manner I provide a reel which may be used either by a right or left handed angler. When the preference of the one who is to use the reel is known, heads may be made of different thicknesses and the studs 2' of different lengths to distinguish the reel. In other words, the heads may be non-interchangeable.

The rear head contains a central bearing $9^a$ for the rear end of the spool-shaft 10. The shaft 10 is larger at the middle than at the end. At one end it is provided with an integral pinion 10' for engagement with either of the hereinafter-described winding mechanisms. The spool 11 is mounted upon ball-bearings on the shaft 10. These bearings comprise the cones 12 12 on the shaft, the ball-races 13 in the spool, and the balls 14. The front cone may be secured to the shaft by a pin 12', while the rear cone 12 is preferably arranged upon a thread 10'' on shaft 10.

15 is a lock-nut for the cone 14, and 16 is still another locking-nut, the latter being provided with a peripheral groove and serving as a part of the hereinafter-described drag mechanism.

The spool which I prefer to use is a hard-rubber casting having a large barrel 11', containing a proportionately large central cavity. The ball-races are flanged steel rings. The peripheries of said rings are grooved or milled longitudinally and the rings are driven into place in the barrel of the spool. The races are thus effectually fastened into the spool and serve to finish the ends thereof, and it is impossible for the races to slip or turn within the spool. In practice after inserting the races the flanges 11'' of the spool are turned to remove the rough edges and fit the flanges to the rings 3' of the reel-frame, which, as shown in Fig. 4, overlap the ends of the spool.

In molding or casting the spool of hard rubber or other non-metallic resilient material I preferably provide the spool with the longitudinal rib or thickened portion $11^3$, and also with a groove $11^4$, in which the fishing-line may be tied. The rib $11^3$ not only serves to strengthen the spool-barrel, but also provides material in which I may drill a hole $11^5$, in which the line may be tied, if preferred. The advantage of this construction is that the line-securing hole may be made without piercing the barrel of the reel and water is therefore excluded from the interior of the spool.

It will be understood that the driving mechanism operates upon the shaft and not directly upon the spool. The connection between the spool and shaft is made by means of a simple clutch, well shown in Figs. 4, 7, 8, and 9. On the shaft is a small grooved collar 17, having a light hub 17″. The collar is adapted to slide on the shaft, but is held in normally by a light spring 18, arranged in a recess in the collar 17 and presses against the collar $10^3$ of the shaft 10.

19 represents the clutch-arm, having an enlarged central portion fastened on the hub 17″ by expanding the latter therein. The ball-race 13 at the front end of the spool is provided with two or more notches 20 to receive the clutch-arm 19, and the clutch-arm is provided with lugs 19′, movable in, but permanently engaged with, a cross-slot 12″ in the front end of the cone 12 on the winding-shaft. (See Fig. 4 and dotted lines in Fig. 8.) In this manner the clutch is permanently connected with the shaft 10 and when occupying its inner position will establish the connection between the shaft 10 and the spool. When the clutch is drawn out, it is obvious that the spool will be disengaged, so that it may run freely upon its ball-bearings. For operating the clutch I employ a clutch-lever 21, for which there are preferably two fastenings or pivots 22 on the front head, the arm being accommodated in a recess in said head. Two fastenings are rendered necessary by the interchangeability of the front head from right to left. The arm 21 has a lug 21″, which extends through an opening or notch $21^3$ in the frame-ring 3, there to be engaged by the clutch-operating trigger 22 on the rear cross-bar or spindle 2. The cross-bar is provided with two slots 22′ and corresponding pin-holes 22″, so that the trigger 22 may be fastened in either end of the bar according as the reel is made right or left handed by changing the winding-head from one end to the other. The trigger is provided with a simple foot or short arm $22^3$, that presses against the lug 21″. The lever 21 is forked and engages the grooved collar 17, and said arm is therefore pressed upon by the spring 18. Hence the trigger 22 will be normally held away from the bar 2 and when pressed against the said bar will operate lever 21 to retract the clutch and disengage the spool. It will be observed that the trigger 22 occupies a position on the bar midway of the reel, where it may be easily operated by the ball of the thumb, which the angler uses to stop the spool after making a cast. The arrangement is such that when the end of the thumb is pressed upon the spool the ball of thumb will be naturally lifted from the trigger 22, and the clutch will be permitted to return into engagement with the spool, and thus connect spool and shaft. It is obvious that the clutch will always spring into place as soon as the thumb of the hand is removed away from the frame of the reel. In waters where a long cast cannot be made the spool need not be freed from the winding mechanism and to provide for such use of the reel I arrange the trigger in such manner that it may be thrown up to one side, where it is out of reach of the thumb, as shown by dotted lines in Fig. 1. In moving to this position the heel $22^3$ of the trigger passes the lug 21″, which thereafter serves to hold the trigger in the elevated position, and side pressure upon the trigger cannot result in disengaging the clutch.

In most reels the click and drag are made to engage the spool of the reel, and in case either one is left in engagement with the spool when the angler is preparing to cast his bait a short cast will result. This is a constant source of annoyance to fishermen, and to obviate the same I arrange the click and also the drag mechanism of my reel in connection with the spool-shaft, from which the spool is free during the casting of the bait. At the same time the click and drag will be in instant readiness to operate upon the spool when the trigger 22 is released to allow the entrance of the clutch—in other words, whenever the spool picks up the shaft. The click shown in Fig. 9 may be a simple spring 23, arranged in a recess in the winding-head and adapted to engage with the teeth of the pinion 10′ on shaft 10. The spring is shown arranged upon the stud 23′ on the sliding button 23″, appearing upon the face of the front head. To avoid confusion in the use of the click and drag, I arrange the latter on the rear head of the reel and have succeeded in inventing a drag mechanism that will exert a powerful influence upon the spool and yet in no wise tend to bind the spool or throw it out of alinement. The mechanism referred to is shown in Figs. 4 and 6, comprising a sheave-nut 16 on shaft 10, the flexible band 24, the band-operating lever 25, and the button 26. The shank of the button extends through a slot in the rear head and engages the beveled end of lever 25. The band 24 is secured on pin 27, and when the lever 25 is thrown into the dotted-line position the band will be tightened upon the grooved end of the sheave 16, thereby exerting a braking force on the shaft 10 and through the medium thereof upon the spool of the reel. It will be obvious that both click and drag may engage with the spool-shaft and yet not affect the spool during the casting operation, as the clutch is disengaged from the spool at such times. When the clutch is restored, the drag and the click, or either thereof, will instantly resist further rotation of the spool.

As above stated, I provide two different winding mechanisms for my reel. For use in bait-fishing I prefer the mechanism shown in Figs. 1 and 4, the same being distinguished by the usual crank 28. The shaft of the crank is arranged in a hollow stud 29 on the face-plate 6 on the front head, and on the inner end of the shaft is a large gear 30, that meshes with the pinion 10' of the reel. I have illustrated the usual quadruple gearing, and when the crank 28 is turned the spool will be rapidly rotated through the medium of gear 30, pinion 10', shaft 10, and the clutch. The continuous steady rotation of the spool made possible by the crank movement is best adapted for use in bait-fishing, but is not desirable in fly-fishing, where the best results may be obtained by causing the flies to skip or jump on the surface of the water. This cannot easily be accomplished by the low quadruple gearing customarily used with the winding mechanism. For fly-fishing I therefore dispense with the crank 28 and substitute a simple ratchet-lever 31, arranged on the face-plate of the reel and connected with the reel-pinion 10' by a ratchet-and-gear mechanism in the ratio of one to twelve—that is, one stroke of the lever 31 will produce twelve revolutions of the reel-spool. A greater multiple may be employed, if desired. The most convenient arrangement of the lever 31 is as herein shown, it being intended that the lever shall be operated by the index-finger or the second finger of the hand in which the fishing-rod is grasped. The short shaft 32 of the lever 31 carries a ratchet-wheel 33. 34 is a large gear-wheel journaled on the lever-shaft and provided with a spring-pawl 34', which engages the ratchet-wheel 33. A spring 35 on the shaft 32 serves to return the lever 31 after each back stroke. Multiplying-gears 36, 37, 38, and 39, arranged on studs 40 and 41, connect the gear 34 to reel-pinion 10'. When the lever 31 is drawn back quickly, the ratchet-wheel will be turned and operating through the medium of the multiplying-gears will start the reel-spool into quick rotation, which will result in drawing in the fish-line so rapidly that the fly will be lifted from the water. Thus repeated strokes of the winding or ratchet-lever 31 will cause the bait to jump or fly and more effectively attract the fish.

It will be obvious that the removal of the bait-casting head and the substitution of the fly-casting head occupies but a moment of time, and a fisherman having one of these sectional reels is fully equipped for successful angling in all waters and under all conditions.

It should be specially noted that all of the advantages herein set forth are secured in a reel that is free from screws, which, as proven with other reels, are likely to loosen and become lost.

It will be obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a fishing-reel, a frame provided with end studs, in combination with a head, having a face-plate and a locking-ring arranged upon the inner side of said face-plate and operable from the exterior thereof to secure the head upon said studs, substantially as described.

2. In a fishing-reel, a frame, in combination with a head, a rotary locking-ring arranged in said head and adapted when partially rotated to engage the head or disengage the same from said frame, substantially as described.

3. In a fishing-reel, a frame having an end ring and end studs, in combination with a two-part head fitted upon said studs, and a locking-ring arranged upon said parts and operable from the exterior thereof to secure the head on, or free the head from said studs, substantially as described.

4. In a fishing-reel, a frame provided with notched end studs, in combination with a head, composed of metallic and non-metallic parts and having openings to receive said studs, a locking-ring arranged in said non-metallic part and notched to correspond with said studs, and means upon the exterior of the head for operating said ring, substantially as described.

5. In a fishing-reel, a frame, provided with notched end studs, in combination with a head fitted upon said studs and provided with an internal annular recess, a locking-ring notched to correspond with said studs and fitted in said recess and means for operating said ring, on the exterior of said head, substantially as described.

6. In a fishing-reel, a frame, provided with end studs, in combination with a head, a movable locking device arranged in said head and means on the exterior of the head for operating said device to engage or disengage the same with said studs, substantially as described.

7. In a fishing-reel, a frame, provided with head-retaining studs upon its ends, in combination with heads fitted upon said studs and held stationary thereby and a device in the head for securing the same to the studs, substantially as described.

8. In a fishing-reel, a frame provided at each end with studs, in combination with heads having openings to fit corresponding studs, each of said heads containing a locking device operable from its exterior and adapted to secure the same upon the frame, substantially as described.

9. In a fishing-reel, a frame, composed of end rings having spindle-holes, in combination with spindles or cross-bars rigidly secured to said rings and having reduced, integral ends extending through the holes in said rings and forming head-securing studs, suitable heads and means movable therein for fastening the same upon said studs, substantially as described.

10. In a fishing-reel, a frame, composed of end rings and a plurality of cross-bars having ends extending through said rings and notched as described, in combination with front and rear heads having openings to receive corresponding studs, said heads having metallic face-plates through which the ends of said studs appear, a locking device contained in said heads to engage the reduced ends of said cross-bars and adapted for operation to disengage the heads therefrom substantially as described.

11. A new article of manufacture, comprising a fishing-reel spool, having a hollow barrel which is thickened at the middle, the thickened portion containing a line recess or opening that does not pierce the barrel, substantially as described.

12. A new article of manufacture, comprising a fishing-reel spool composed of a non-metallic casting and having a hollow barrel, in combination with milled, serrated metallic bearing-rings sunk in the ends of said barrel, substantially as described.

13. In a fishing-reel, a frame and head, in combination with a spool-shaft, means for rotating said shaft, a spool revoluble on said shaft, a drag mechanism for engagement with said shaft and a clutch normally connecting said shaft and spool and adapted for operation to free said spool from said shaft and drag mechanism, substantially as described.

14. A fishing-reel, comprising a frame and a spool suitably mounted therein, in combination with a drag mechanism, and adapted to be permanently set, means for disconnecting the spool from said drag mechanism without freeing said drag mechanism, substantially as described.

15. In a fishing-reel, a frame, heads, driving mechanism and spool-shaft, in combination with click and drag mechanisms to engage said shaft, a spool mounted for free rotation on said shaft and a clutch normally connecting the shaft and spool for simultaneous rotation and adapted for operation to free the shaft, substantially as described.

16. In a fishing-reel, the frame and heads, in combination with suitable driving mechanism, a spool and its shaft, a band for engagement therewith and means for tightening said band thereon, substantially as described.

17. In a fishing-reel, the frame, heads and driving mechanism, in combination with a spool-shaft, a spool mounted thereon, a clutch for connecting the spool and shaft, a sheave on said shaft, a band encircling said sheave and attached to one of said heads and means upon said head for tightening said band upon said sheave to resist the rotation of said shaft and spool, substantially as described.

18. In a fishing-reel, a frame having a plurality of cross-bars or spindles, front and rear heads detachably secured to the ends of said spindles, a spool-shaft having bearings in said heads, a spool revolubly mounted upon said shaft, a clutch connecting said spool and said shaft and a horizontal trigger mounted upon one of said cross-bars and substantially parallel therewith for operating said clutch, substantially as described.

19. In a fishing-reel, a frame and front and rear heads detachably secured thereto, in combination with a spool-shaft, a spool mounted for free rotation on said shaft, a clutch normally connecting the spool and shaft and a horizontal clutch-operating trigger arranged between said heads in convenient position to be operated by the thumb of the hand when the reel is in use, substantially as described.

20. In a fishing-reel, a frame, the heads and spool, in combination with a plurality of gears, arranged in one of said heads for driving said spool, a clutch for disconnecting the spool from said gear, a conveniently-positioned clutch-trigger and a spring-returned swinging lever for operating said gears, substantially as descrbed.

21. In a fishing-reel, a frame, in combination with a head, a spool and spool-pinion, a plurality of gears arranged in said head for driving said pinion and spool, a lever provided on said head and a single-directioned driving mechanism connecting the said lever and gears, substantially as described.

22. In a fishing-reel, a reel-head containing a plurality of gears, in combination with a lever pivoted on said head, a spring for returning said lever and a pawl-and-ratchet device joining said lever and gear, substantially as described.

23. In a fishing-reel, a frame, comprising end rings and spindles, in combination with heads arranged on said frame, a driving mechanism in one of said heads, a spool mounted between said heads, a clutch normally connecting the said spool and driving mechanism, a clutch-lever, one of said spindles with a slot or recess and a clutch-lever-operating trigger mounted in said recess, substantially as described.

24. In a fishing-reel, the combination with the frame rods or bars, having notched ends, of a detachable head or casing, containing the gearing and having holes in its end plate for the reception of said rods or bars, a slotted locking-ring mounted within said casing and adapted to engage with the notched ends of said rods, and a detachable line spool or bobbin.

In testimony whereof I have hereunto set my hand, this 22d day of September, 1904, at Cleveland, Ohio.

ROBERT L. HUNTER.

In presence of—
JOHN A. ALBURN,
EDWARD SCHULTZ.